United States Patent [19]

Aoyama

[11] Patent Number: 4,779,729
[45] Date of Patent: Oct. 25, 1988

[54] MAGNETIC TAPE CASSETTE
[75] Inventor: Kazunori Aoyama, Kanagawa, Japan
[73] Assignee: Fuji Photo Film Co., Ltd., Kanagawa, Japan
[21] Appl. No.: 19,403
[22] Filed: Feb. 26, 1987
[30] Foreign Application Priority Data Feb. 26, 1986 [JP] Japan .............................. 61-25773[U]

[51] Int. Cl.⁴ ............................................. B65D 85/67
[52] U.S. Cl. .................................... 206/387; 206/459
[58] Field of Search ................................ 206/387, 459

[56] References Cited

U.S. PATENT DOCUMENTS

| 3,515,262 | 6/1970 | Ornstein et al. | 206/459 |
| 3,679,047 | 7/1972 | Papirnyik | 206/459 |
| 3,726,030 | 4/1973 | Wilson | 206/387 |
| 4,202,450 | 5/1980 | Howell et al. | 206/459 |
| 4,331,236 | 5/1982 | Bauer | 206/459 |
| 4,385,693 | 5/1983 | Gelardi et al. | 206/459 |
| 4,407,410 | 10/1983 | Graetz et al. | 206/387 |
| 4,643,301 | 2/1987 | Hehn et al. | 206/387 |

Primary Examiner—Joseph Man-Fu Moy
Attorney, Agent, or Firm—Sughrue, Mion, Zinn, Macpeak, and Seas

[57] ABSTRACT

A tape cassette in which the cassette case consists of an inner layer and a transparent outer layer. An information pattern on a sheet or directly printed on the inner layer is disposed between the inner and outer layers.

9 Claims, 1 Drawing Sheet

MAGNETIC TAPE CASSETTE

BACKGROUND OF THE INVENTION

1. Field of the Invention

This invention relates to magnetic tape cassettes, and more particularly to a magnetic tape cassette in which the cassette case for enclosing a magnetic tape is improved.

2. Background of the Invention

As is well known in the art, in an audio or video magnetic tape cassette, a magnetic tape is set in its cassette case which is generally made of plastic resin such as ABS resin. Usually, forms or patterns of a cassette specification or data are provided on the surface of the case. The forms or patterns are, in general, printed directly on the surface of the case, or a sheet on which the forms or patterns have been printed is bonded to the surface of the case. Therefore, the conventional magnetic tape cassette suffers from a difficulty that, as it is used for a long period, the printing ink becomes illegible or the sheet is peeled off from the case surface. This problem is serious for the magnetic tape cassette because recently the magnetic tape has been improved in its characteristics and can be used semipermanently for recording and reproducing of information.

SUMMARY OF THE INVENTION

Accordingly, an object of this invention is to eliminate the above-described difficulty accompanying a conventional magnetic tape cassette.

More specifically, an object of the invention is to provide a magnetic tape cassette in which, even when it is used for a long period, the forms or patterns provided on the cassette case are maintained in a satisfactory state.

The foregoing object of the invention has been achieved by the provision of a magnetic tape cassette comprising a cassette case consisting of the upper and lower half-cases and a magnetic tape incorporated in the cassette case. According to the invention, each of the upper and lower half-cases is made up of an inner layer and an outer layer which is transparent and forms or patterns are provided between the inner and outer layers.

DETAILED DESCRIPTION OF THE PREFERRED EMBODIMENTS

One embodiment of this invention will be described with reference to the accompanying drawing in detail.

Figure 1:
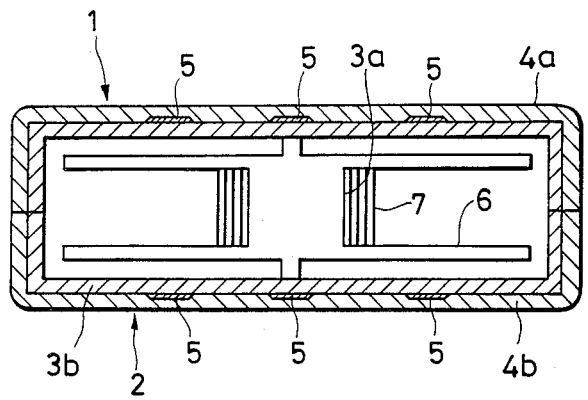
FIG. 1 is a vertical sectional view outlining a magnetic tape cassette which is one embodiment of this utility model.
Figure 2:
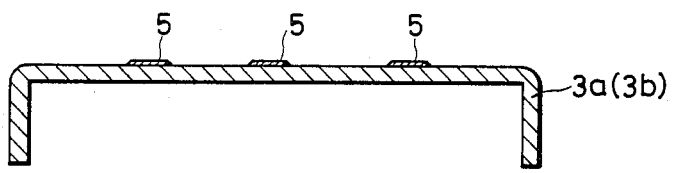
FIG. 2 is a vertical sectional view showing a half case provided in the manufacture of the magnetic tape cassette according to the invention.

FIG. 1 is a vertical sectional view outlining a magnetic tape cassette according to the utility model. FIG. 2 is a vertical sectional view showing a case provided in the manufacture of the magnetic tape cassette. In FIGS. 1 and 2, many of the components which are not directly related to the technical concept of the invention are not shown.

The case of the magnetic tape cassette, as shown in FIG. 1, comprises upper and lower half-cases 1 and 2. Within the half cases 1 and 2 are two reels 6 on which is wound a magnetic tape 7. Each of the upper and lower half-cases is of a dual structure. More specifically, the upper half case 1 is made up of an inner (or base) layer 3a and an outer (or surface) layer 4a. The lower half case 2 is also made up of an inner layer 3b and an outer layer 4b. Forms or patterns 5 are provided between the inner layers 3a and 3b and the outer layers 4a and 4b.

The outer layers 4a and 4b are made of a transparent or translucent plastic resin so that the forms or patterns 5 can be observed through them from outside. The inner layers 3a and 3b may be made of transparent plastic resin or plastic resin having a color which is selected with respect to the forms or patterns 5.

In order to provide the forms or patterns 5 on the outer surfaces of the inner layers 3a and 3b, heatresistant ink or heat-resistant sheets are used. That is, the forms or patterns 5 are provided simultaneously when the inner layers 3a and 3b are formed by extrusion molding, or after the extrusion molding. The inner layers 3a and 3d thus formed are covered with the respective outer layers 4a and 4b for instance by double-color molding. Thus, the upper and lower half cases 1 and 2 have been manufactured. It goes without saying that the inner layers 3a and 3b and the outer layers 4a and 4b are made of compatible plastic resin.

The outer layers 4a and 4b, which have been so formed as to cover the forms or patterns 5, can prevent the forms or patterns 5 from being worn or damaged.

Figure 3:
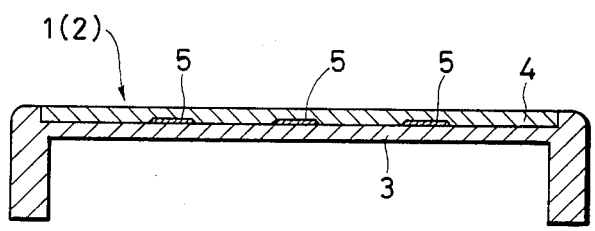
FIG. 3 is a sectional view showing essential components of one modification of the cassette shown in FIG. 1.

In the above-described embodiment, the outer surfaces of the inner layers 3a and 3b are completely covered by the outer layers 4a and 4b, respectively. However, the invention is not limited thereby or thereto. For instance, each of the half cases may be designed as shown in FIG. 3. FIG. 3 shows one of the half cases which are symmetrical with each other. As is apparent from FIG. 3, similary as in the case shown in FIG. 1, forms or patterns 5 are provided between an inner layer 3 and an outer layer 4. However, it should be noted that the outer layer 4 is in the form of a flat plate, and is fitted between the side walls of the inner layer 3.

As was described above, in the magnetic tape cassette of the invention, the forms or patterns indicating a cassette specification or the like are inserted between the inner layers 3, 3a and 3b and the outer layers 4, 4a and 4b, and the outer layers 4, 4a and 4b protect the forms or patterns 5 from damage. Therefore, the magnetic tape cassette of the invention is free from the difficulties that the contents of the forms or patterns 5 are made unclear by wearing or the forms or patterns 5 are peeled off or damaged. That is, in the magnetic tape cassette provided according to the invention, the display functions of the forms or patterns 5 are maintained unchanged for a long period of time.

What is claimed is:

1. A recording tape cassette, comprising:
    a cassette case for enclosing a recording tape during recording and reproduction operations, said cassette case comprising an upper half case and a lower half case, at least one of said half cases comprising an inner layer and a light transmitting outer layer;

a visually observable information pattern disposed between said inner and outer layers; and at least one reel for winding said recording tape contained in said cassette case.

2. A tape cassette as recited in claim 1, wherein said information pattern comprises an ink-printed sheet.

3. A tape cassette as recited in claim 1, wherein said information pattern comprises patterned ink formed on an outer surface of said first layer.

4. A tape cassette as recited in claim 1, wherein said half cases comprise molded plastic.

5. A tape cassette as recited in claim 2, wherein said half cases comprise molded plastic.

6. A tape cassette as recited in claim 3, wherein said half cases comprise molded plastic.

7. A tape cassette as recited in claim 1, wherein each of said half cases comprises respective ones of said inner layer and said outer layer and said inner and outer layers substantially enclose said at least one reel.

8. A tape cassette as recited in claim 5, wherein each of said half cases comprises respective ones of said inner layer and said outer layer and said inner and outer layers substantially enclose said at least one reel.

9. A tape cassette as recited in claim 6, wherein each of said half cases comprises respective ones of said inner layer and said outer layer and said inner and outer layers substantially enclose said at least one reel.

* * * * *